United States Patent
Yoshida

(10) Patent No.: US 11,017,457 B2
(45) Date of Patent: May 25, 2021

(54) INFORMATION PROCESSING SYSTEM AND INFORMATION PROCESSING METHOD OF INFORMATION PROCESSING SYSTEM

(71) Applicant: CASIO COMPUTER CO., LTD., Tokyo (JP)

(72) Inventor: Hiroyuki Yoshida, Sayama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 296 days.

(21) Appl. No.: 16/045,508

(22) Filed: Jul. 25, 2018

(65) Prior Publication Data
US 2019/0035005 A1    Jan. 31, 2019

(30) Foreign Application Priority Data
Jul. 28, 2017    (JP) .............................. JP2017-146315

(51) Int. Cl.
    *G06Q 30/00*    (2012.01)
    *G06Q 30/06*    (2012.01)
    *G06F 16/27*    (2019.01)

(52) U.S. Cl.
    CPC ..... *G06Q 30/0641* (2013.01); *G06Q 30/0633* (2013.01); *G06F 16/27* (2019.01)

(58) Field of Classification Search
    CPC ...... G06Q 30/0601–0645; G06Q 30/80; G06F 16/02
    USPC ..... 705/26.1, 26.2, 26.25, 26.3, 26.35, 26.4, 705/26.41, 26.42, 26.43, 26.44, 26.5, 705/26.6, 26.61, 26.62, 26.63, 26.64,
    (Continued)

(56) References Cited

U.S. PATENT DOCUMENTS 10,580,029 B2 *   3/2020   Beatty .................. G06Q 20/202
2005/0267916 A1   12/2005  Tone et al.
(Continued)

FOREIGN PATENT DOCUMENTS

JP    H11316721 A    11/1999
JP    2003345965 A   12/2003
(Continued)

OTHER PUBLICATIONS

Clover Network, Inc.; "Bierhaus Customers Can Now Order and Pay for Their Beers and Brats From the Table, Thanks to a New iPhone 6 Bierhaus App and Apple Pay," Journal of Engineering [Atlanta] Nov. 5, 2014: 354; Dialog #1617901540. 2pgs. (Year: 2014).*

(Continued)

*Primary Examiner* — Robert M Pond
(74) *Attorney, Agent, or Firm* — Holtz, Holtz & Volek PC

(57) ABSTRACT

An information processing system includes a local server and a cloud server. The cloud server includes the following. A receiver receives input of temporary input data. A transmitter transmits the temporary input data based on a transmitting request from the local server. The local server includes the following. A monitoring unit monitors whether the temporary input data is received in the cloud server. A transmitting request unit requests the temporary input data when the monitoring unit determines that the temporary input data is received. A receiver receives the temporary input data. A reflecting unit reflects the temporary input data on a data input form. A registering unit registers data input on the data input form in a database of the local server when data input on the data input form is finished.

14 Claims, 8 Drawing Sheets

(58) Field of Classification Search
USPC ..... 705/26.7, 26.8, 26.81, 26.82, 26.9, 27.1, 705/27.2, 26, 27
See application file for complete search history.

(56) References Cited

U.S. PATENT DOCUMENTS

| | | | | |
|---|---|---|---|---|
| 2011/0029344 | A1* | 2/2011 | Weiler | G06Q 30/06 705/7.35 |
| 2011/0208695 | A1* | 8/2011 | Anand | G06F 16/273 707/610 |
| 2013/0211870 | A1* | 8/2013 | Lawson | H04L 67/125 705/7.25 |
| 2013/0226738 | A1* | 8/2013 | Sharma | G06Q 30/04 705/26.81 |
| 2016/0125449 | A1* | 5/2016 | Beatty | G06Q 20/202 705/14.38 |
| 2016/0232470 | A1* | 8/2016 | Zhou | G06Q 10/06316 |
| 2016/0261564 | A1* | 9/2016 | Foxhoven | H04L 67/1021 |
| 2017/0180517 | A1* | 6/2017 | Kornmann | H04L 67/1097 |

FOREIGN PATENT DOCUMENTS

| | | |
|---|---|---|
| JP | 2006012121 A | 1/2006 |
| JP | 2007188442 A | 7/2007 |
| JP | 2016174229 A | 9/2016 |
| JP | 2016206759 A | 12/2016 |
| JP | 2016208931 A | 12/2016 |
| JP | 2017033607 A | 2/2017 |

OTHER PUBLICATIONS

"Apatar Launches Hosted Salesforce.com and QuickBooks Integration, Slashes Deployment Time by a Factor of Ten," M2 Presswire Jul. 11, 2008, Dialog Asscession #181200892, 2pgs. (Year: 2008).*
Japanese Office Action dated Feb. 25, 2020 (and English translation thereof) issued in counterpart Japanese Application No. 2017-146315.

* cited by examiner

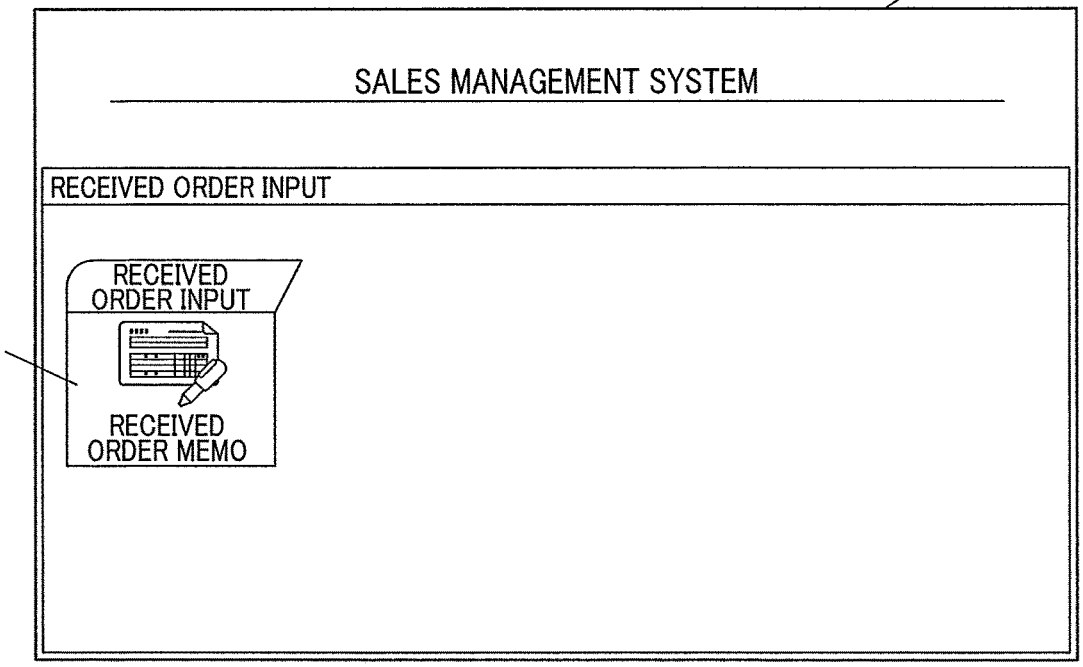

INFORMATION PROCESSING SYSTEM AND INFORMATION PROCESSING METHOD OF INFORMATION PROCESSING SYSTEM

CROSS-REFERENCE TO RELATED APPLICATIONS

This application is based upon and claims the benefit of priority from the prior Japanese Patent Application No. 2017-146315, filed on Jul. 28, 2017, the entire contents of which are incorporated herein by reference.

BACKGROUND OF THE INVENTION

1. Field of the Invention

The present invention relates to an information processing system and an information processing method of the information processing system.

2. Description of the Related Art

Conventionally, there is an accounting system which inputs transaction data such as received and placed orders and registers order slips. In such accounting system, the number of items to be input when the transaction data is input is set to be as small as possible so that the input process of the transaction data is simple (Japanese Patent Application Laid-Open Publication No. 2007-188442).

SUMMARY OF THE INVENTION

The purpose of the present invention is to provide an information processing system and an information processing method used in an information processing system in which input of transaction data can be performed simply and rapidly.

According to an aspect of the present invention, there is an information processing system including: a local server; and a cloud server which is connected to the local server through a network and which is provided in a cloud environment, wherein, the cloud server includes, a receiver which receives from a terminal apparatus input of temporary input data used in a predetermined registration process performed in the local server, and a transmitter which transmits the temporary input data to the local server based on a transmitting request from the local server, the local server includes, a monitoring unit which monitors whether the temporary input data used in the predetermined registration process performed in the local server is received in the cloud server, a transmitting request unit which requests to the cloud server transmitting of the temporary input data when the monitoring unit determines that the temporary input data is received, a receiver which receives the temporary input data transmitted by a request from the transmitting request unit; a reflecting unit which reflects the temporary input data received by the receiver on a data input form of the predetermined registration process, and a registering unit which registers data input on the data input form in a database of the local server when data input on the data input form in the predetermined registration process is finished.

According to another aspect of the present invention, there is an information processing method of an information processing system including a local server, and a cloud server which is connected to the local server through a network and which is provided in a cloud environment, the information processing method including: receiving by a receiver of the cloud server from a terminal apparatus input of temporary input data used in a predetermined registration process performed in the local server; monitoring by a monitoring unit of the local server whether the temporary input data used in the predetermined registration process performed in the local server is received in the cloud server; requesting by a transmitting request unit of the local server to the cloud server transmitting of the temporary input data when the monitoring unit determines that the temporary input data is received; transmitting by a transmitter of the cloud server the temporary input data to the local server based on a transmitting request of the temporary input data from the local server; receiving by a receiver of the local server the temporary input data transmitted by a request from the transmitting request unit; reflecting by a reflecting unit of the local server the temporary input data received by the receiver on a data input form of the predetermined registration process; and registering by a registering unit of the local server data input on the data input form in a database of the local server when data input on the data input form in the predetermined registration process is finished.

BRIEF DESCRIPTION OF THE DRAWINGS

FIG. 7 is a diagram showing a received order input operation menu.

FIG. 8 is a diagram showing a received order memo input screen.

DETAILED DESCRIPTION OF THE PREFERRED EMBODIMENTS

<Configuration of Sales Management System>

A schematic configuration of a sales management system 100 (information processing system) is described with reference to FIG. 1.

Figure 1:
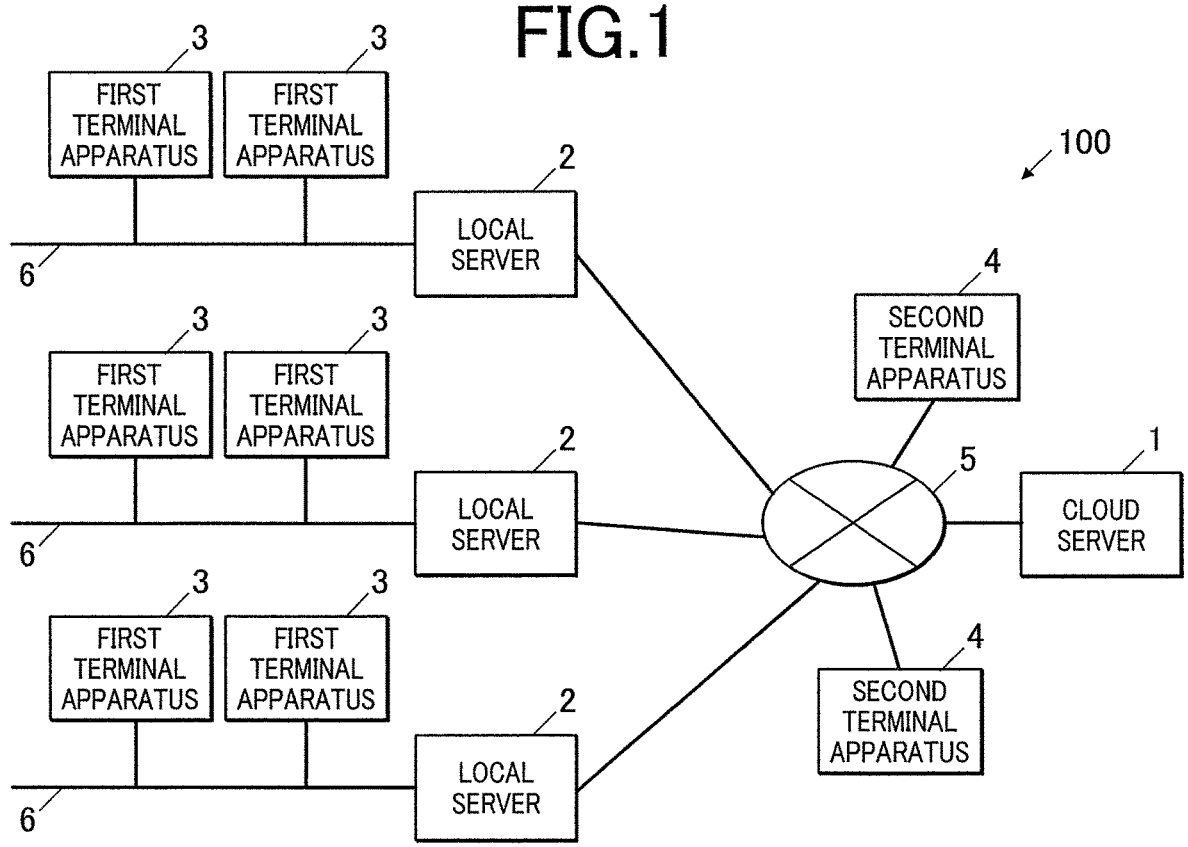
FIG. 1 is a block diagram showing a sales management system according to an embodiment of the present invention.

FIG. 1 is a diagram showing a schematic configuration of a sales management system 100.

As shown in FIG. 1, the sales management system 100 according to the present embodiment includes a cloud server 1, a plurality of local servers 2, a plurality of first terminal apparatuses 3, and a plurality of second terminal apparatuses 4. For example, the cloud server 1 is connected to the local servers 2 to be able to communicate information through the internet 5. For example, the local servers 2 are connected to the first terminal apparatus 3 to be able to communicate information through a LAN (Local Area Network) 6. The second terminal apparatus 4 is connected to the cloud server 1 through the internet 5 to be able to communicate information through the internet 5.

The cloud server 1 is a server which provides to the user a cloud service as part of the sales management system 100. The cloud server 1 stores and manages for each user (client) an operation information database (DB) regarding operation information. Here, operation information does not show how the sales management system operates, but shows how routine business is processed as information necessary in a sales management system. The cloud server 1 executes various programs to perform various data processes in the operation information DB (for example, processes to perform functions such as registration and reference of received order memo (later described), viewing of slips and invoices, marketing analysis and the like). It is possible to access to the cloud server 1 when authentication according to authentication information succeeds.

For example, the local server 2 is a server positioned in an office of a user (client) such as an owner of a private company, an owner of a small/medium company or a store manager of a private store. The local server 2 stores and manages the operation information DB for the operation information of the user. The local server 2 executes various programs stored in advance to perform various data processes in the operation information DB (for example, processes to perform functions such as sales management, purchasing management, inventory management).

For example, the first terminal apparatus 3 is a tablet PC (personal computer), a note PC, a desktop PC or the like. The first terminal apparatus 3 shares the operation information DB stored in the local server 2 through the LAN 6. Similar to the local server 2, the first terminal apparatus 3 executes various programs installed in advance to perform various data processes in the operation information DB.

For example, the second terminal apparatus 4 is an apparatus which the user is able to use outside the office such as a smartphone, a tablet PC, a cellular phone, a PDA, a note PC, or a desktop PC. The second terminal apparatus 4 receives input from the user, transmits the information based on the input to the cloud server 1, and displays the information received from the cloud server 1. The second terminal apparatus 4 may also function as the above-described first terminal apparatus 3.

Figure 2:
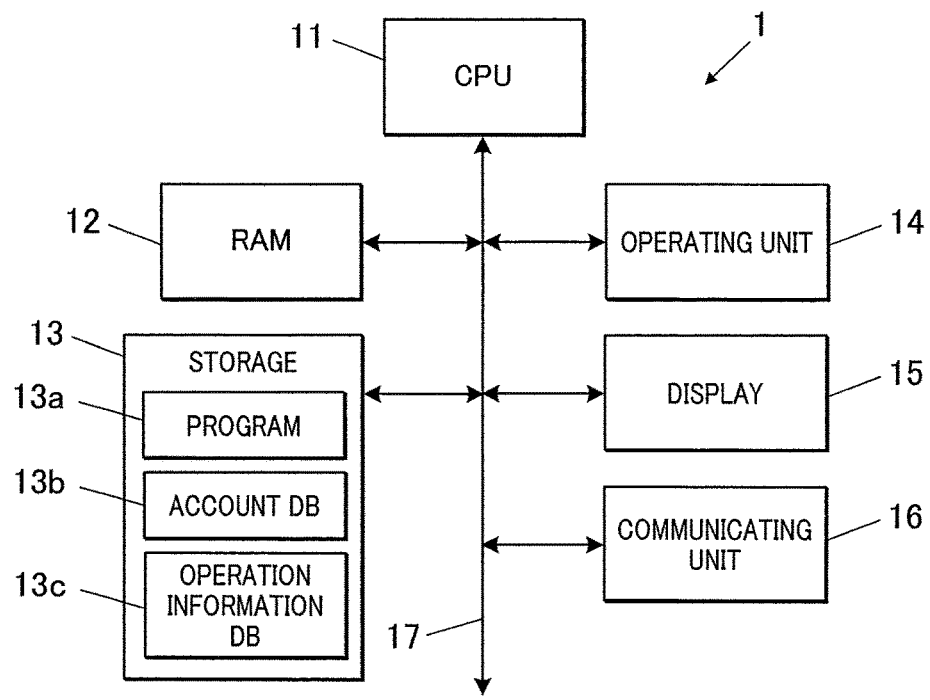
FIG. 2 is a block diagram showing a functional configuration of a cloud server.

FIG. 2 is a block diagram showing a functional configuration of a cloud server 1.

As shown in FIG. 2, the cloud server 1 includes a CPU (Central Processing Unit) 11 (receiver, transmitter), a RAM (Random Access Memory) 12, a storage 13, an operating unit 14, a display 15, and a communicating unit 16 (transmitter). Each unit of the cloud server 1 is connected to each other through a bus 17.

The CPU 11 controls each unit of the cloud server 1. The CPU 11 reads a specified program among the system program and application programs stored in the storage 13, deploys the programs in the RAM 12, and executes various processes according to the programs.

The RAM 12 is a volatile memory, for example, and includes a work area to temporarily store various programs and data read by the CPU 11.

The storage 13 includes a HDD (Hard Disk Drive), a SSD (Solid State Drive), for example, and is a storage in which data and programs are readable and writable. The storage 13 stores a program 13*a*, an account DB 13*b*, an operation information DB 13*c* and the like.

The program 13*a* includes the above-described various system programs and application programs executed by the CPU 11.

Information regarding the account for the user of the sales management system 100 is registered in the account DB 13*b*. Here, the information regarding the account includes a specific user name and password for each account. According to the present embodiment, the authentication information includes the combination of the user name and the password.

The operation information DB 13*c* is the database in which the operation information for the target of management (user owning the local servers 2) in the sales management system 100 is registered. The operation information DB 13*c* includes a received order details DB in which the later-described received order memo is registered.

For example, the operating unit 14 includes a key input unit such as a keyboard or a pointing device such as a mouse. The operating unit 14 receives the key input and the position input, and outputs the operating information to the CPU 11.

For example, the display 15 includes a LCD (Liquid Crystal Display), an organic EL (Electro Luminescence) display and the like. According to the instruction of the display signal received from the CPU 11, the display 15 displays various screens.

For example, the communicating unit 16 includes a network card, etc. The communicating unit 16 is connected to communicate with the internet 5, and communicates with the device (for example, local server 2, second terminal apparatus 4, etc.) on the internet 5.

Figure 3:
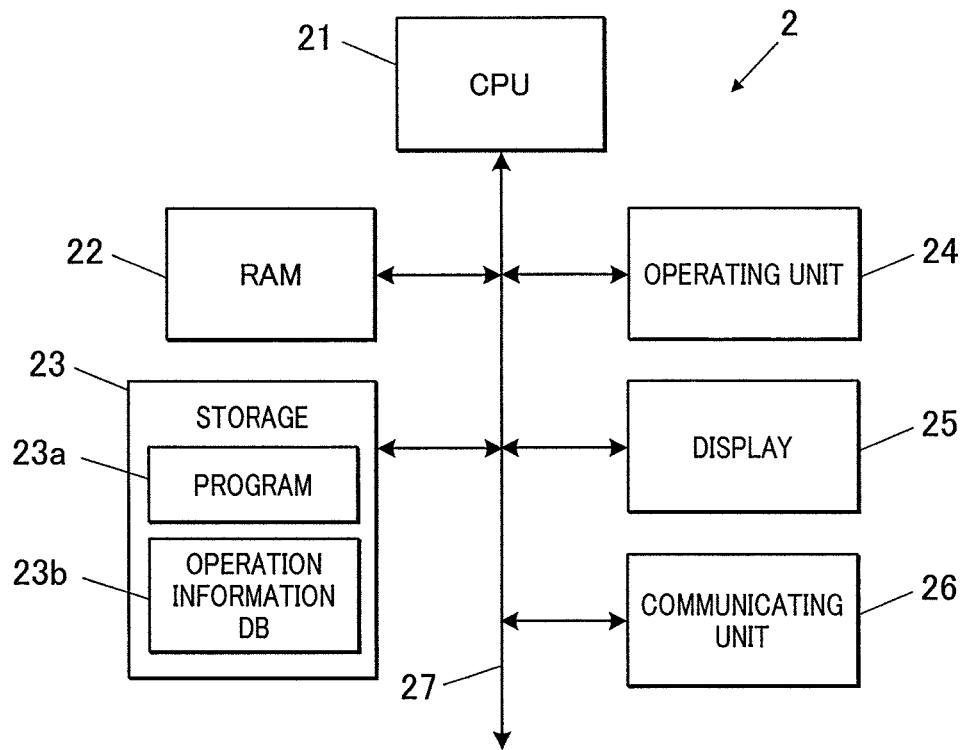
FIG. 3 is a block diagram showing a functional configuration of a local server.

FIG. 3 is a block diagram showing a functional configuration of the local server 2.

As shown in FIG. 3, the local server 2 includes a CPU 21 (monitoring unit, receiver, reflecting unit, registration unit, notifying unit, synchronizing unit), a RAM 22, a storage 23, an operating unit 24, a display 25, and a communicating unit 26 (receiver). Each unit of the local server 2 is connected to each other through a bus 27.

The CPU 21 controls each unit of the local server 2. The CPU 21 reads a program specified among the system program and the application programs stored in the storage 23, deploys the specified program in the work area of the RAM 22, and executes various processes according to the program.

For example, the RAM 22 is a volatile memory, and includes a work area to temporarily store various programs and data read by the CPU 21.

For example, the storage 23 includes a HDD, a SSD, etc., and is a storage in which data and programs can be written and read. The storage 23 stores a program 23*a*, and operation information DB 23*b*.

The program 23*a* includes the above-described various system programs and application programs executed by the CPU 21.

The operation information DB 23*b* is a database in which operation information for the target of management (user possessing local server 2 in which operation information DB 23*b* is stored) in the sales management system 100 is registered.

The configuration of the operating unit 24, the display 25, and the communicating unit 26 is the same as the configuration of the operating unit 14, the display is, and the communicating unit 16 of the cloud server 1, and therefore, the detailed description is omitted.

Figure 4:
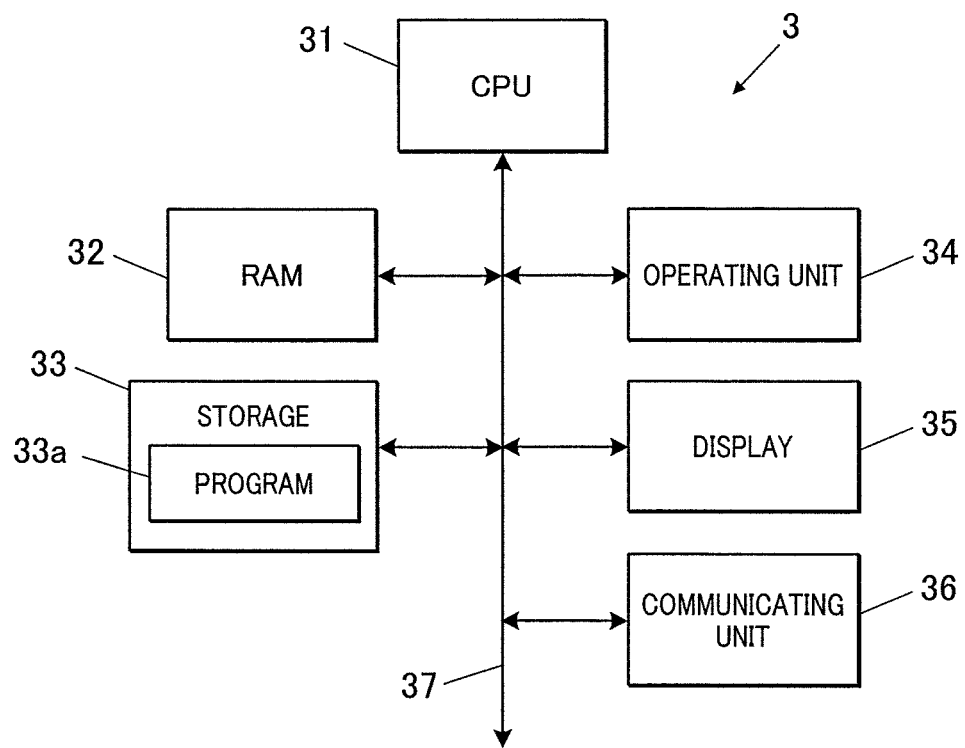
FIG. 4 is a block diagram showing a functional configuration of a first terminal apparatus.

FIG. 4 is a block diagram showing a functional configuration of the first terminal apparatus 3.

As shown in FIG. 4, the first terminal apparatus 3 includes a CPU 31, a RAM 32, a storage 33, an operating unit 34, a display 35, and a communicating unit 36. Each unit of the first terminal apparatus 3 is connected to each other through a bus 37.

The CPU 31 controls each unit of the first terminal apparatus 3. The CPU 31 reads a program specified among the system program and the application programs stored in the storage 33, deploys the specified program in the work area of the RAM 32, and executes various processes according to the program. Here, the CPU 31 controls the RAM 32 to store various processing results, and controls the display 35 to display the processing results as necessary.

For example, the RAM 32 is a volatile memory including a work area temporarily storing various programs and data readout by the CPU 31.

For example, the storage 33 includes a HDD, a SSD, etc., and is a storage in which data and programs can be written and read. The storage 33 stores a program 33a. The program 33a includes the above-described various system program and application programs executed by the CPU 31.

The configuration of the operating unit 34, the display 35, and the communicating unit 36 is the same as the configuration of the operating unit 14, the display 15, and the communicating unit 16 of the cloud server 1, and therefore, the detailed description is omitted.

Figure 5:
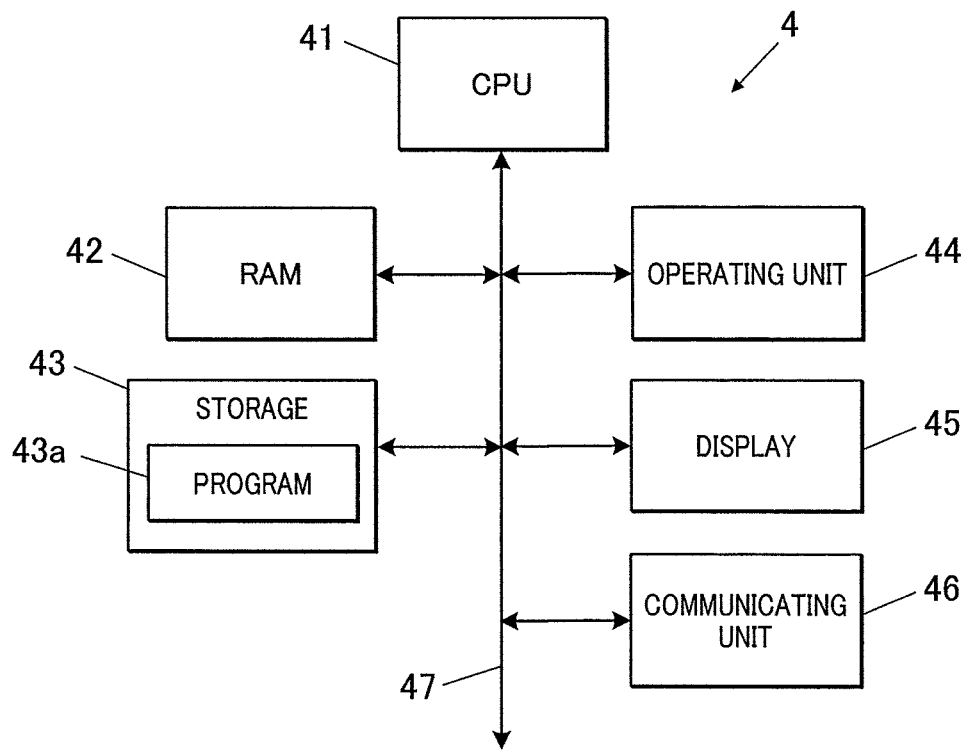
FIG. 5 is a block diagram showing a functional configuration of a second terminal apparatus.

FIG. 5 is a block diagram showing a functional configuration of a second terminal apparatus 4.

As shown in FIG. 5, the second terminal apparatus 4 includes a CPU 41, a RAM 42, a storage 43, an operating unit 44, a display 45, and a communicating unit 46. Each unit of the second terminal apparatus 4 is connected to each other through the bus 47. The configuration of the second terminal apparatus 4 is the same as the configuration of the first terminal apparatus 3 and the detailed description is omitted.

<Registration Method of Received Order Memo in Sales Management System>

According to the sales management system 100 of the present embodiment, the user (for example, sales representative) is able to register some of the information for an order received outside the office as a received order memo (temporary input data) in the received order details DB (operation information DB 13c) of the cloud server 1. Below, the method of registration of the received order memo in the sales management system 100 is described.

Figure 6:
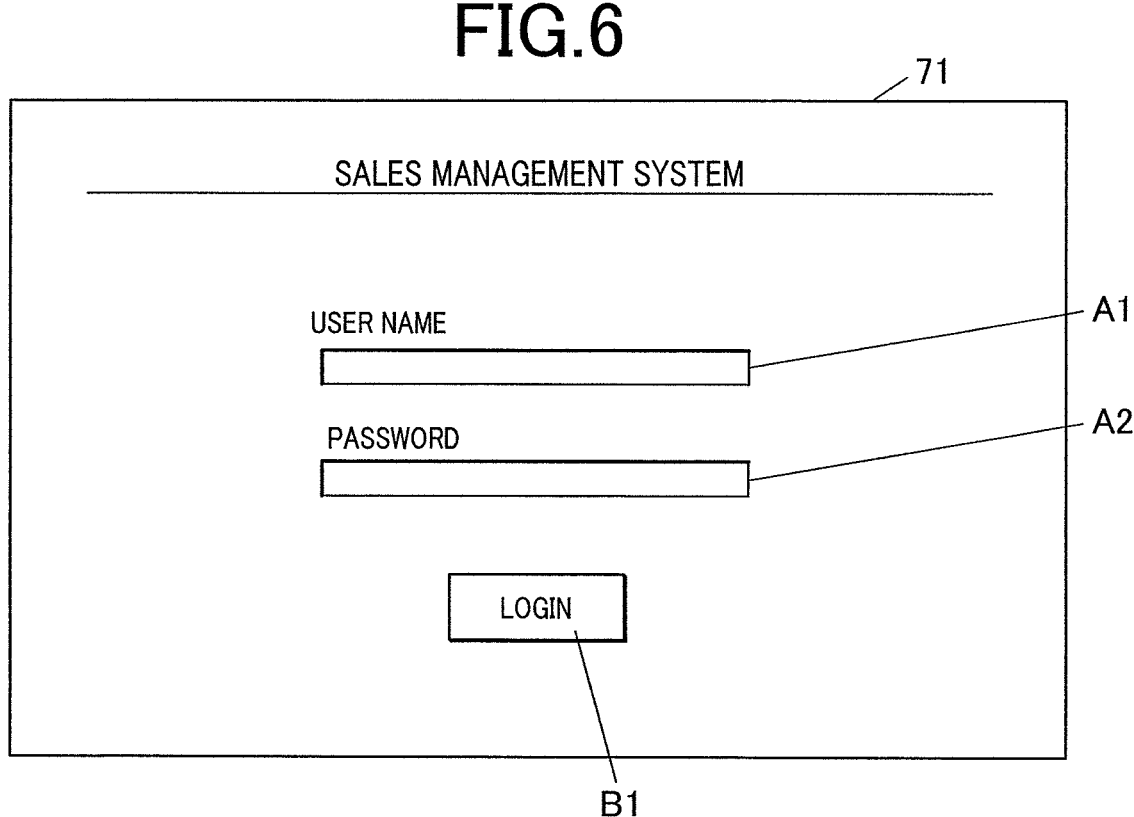
FIG. 6 is a diagram showing a login screen to login to the cloud server.

FIG. 6 is a diagram showing a login screen 71 to login to the cloud server 1.

The login screen 71 is a screen which is displayed on the display 45 when a browser program is executed in the second terminal apparatus 4 and access to a predetermined web site is made in order to login to the cloud server 1. A text box A1 to input a user name of the account used to login, a text box A2 to input a password, and a login button B1 are displayed in the login screen 71.

According to input on the operating unit 44 of the second terminal apparatus 4, the user name is input on the text box A1, the password is input on the text box A2, and then when the login button B1 is selected and input in this state, the input authorization information is transmitted to the cloud server 1 and the information is compared with the authorization information stored in the account DB 13b. When the input authorization information matches with the registered authorization information of any one of the accounts (authorization information is determined to be proper), the CPU 11 of the cloud server 1 performs the login process to the cloud server 1 with this account and the login session is started.

FIG. 7 is a diagram showing a received order input operation menu screen 72. The received order input operation menu screen 72 is a screen which is displayed when the menu button (not shown) regarding the received order input operation is selected from the main menu screen (not shown) displayed when the user logs in to the cloud server 1. The received order input operation menu screen 72 displays an icon I1 to execute functions regarding input of the received order memo.

When the user inputs and selects the icon I1, the later-described received order memo input screen 73 is displayed on the display 45.

FIG. 8 is a diagram showing a received order memo input screen 73. Such received order memo input screen 73 displays a pulldown menu M1 with which the slip date can be selected by a pulldown format and a pulldown menu M2 with which a shipping scheduled date and a shipping scheduled time can be selected by a pulldown format. The received order memo input screen 73 displays a pulldown menu M3 with which a valued customer code can be selected by a pulldown format, and the valued customer code is selected with the pulldown menu M3. By selecting the valued customer code (for example, "000003") with the pulldown menu M3, the name of the valued customer (for example, "Okamura Shokai, CO., LTD.) corresponding to the valued customer code can be automatically input in the text box A3 displayed to the right of the pulldown menu M3. The received order memo input screen 73 displays a pulldown menu M4 with which the person in charge code can be selected by the pulldown format. By selecting the person in charge code by the pulldown menu M4, the name of the person in charge (for example, "Kenichiro INOUE") corresponding to the person in charge code (for example, "000006") can be automatically input in the text box A4 displayed to the right of the pulldown menu M4. The received order memo input screen 73 displays a text box A5 in which the summary can be input.

The received order memo input screen 73 displays a list L1 with which an amount, unit, unit price, price, remarks, etc. for the merchandise can be input for each merchandise ordered. The list L1 displays a pulldown menu M5 with which the merchandise code can be selected by a pulldown format for each line. By selecting the merchandise code with the pulldown menu M5, the merchandise name (for example, "North Sea striped shrimp") corresponding to the merchandise code (for example, "000008") can be automatically input in the text box A6 displayed to the right of the pulldown menu M5. The list L1 displays the text box A5 in which the amount can be input, the pulldown menu M6 in which the unit of the amount can be selected by a pulldown format, and the pulldown menu M7 in which the unit price of the amount can be selected by the pulldown format. By inputting the amount, the unit, and the unit price, the price (for example, "13,500") corresponding to the amount and the unit price (for example, amount "3", unit price "4500"), can be automatically input in the text box A8 displayed to the right of the pulldown menu M7. The list L1 displays a text box A9 in which remarks can be input and a delete button B2 to delete the list L1 line by line.

The received order memo input screen 73 displays a line addition button B3 to newly add a line to the list L1 in the lower right of the list L1, a register button B4 to register the contents input on the received order memo input screen 73 in the lower left of the list L1 and a clear button B5 to clear the contents.

After the user inputs the necessary items in the pulldown menu M1 to M7 and the text box A3 to A9, the user selects the register button B4. With this, the received order memo can be registered.

<Method to Create Received Order Slip in Sales Management System>

In the sales management system 100 according to the present embodiment, when the received order slip is made in the local server 2 or the first terminal apparatus 3 connected to the local server 2 through the LAN 6, the received order memo registered in the cloud server 1 as described above is imported in the local server 2 and the received order slip is made in the state with the contents of the received order memo reflected on the received order slip input screen. The method to create the received order slip in the sales management system 100 is described below. The example below assumes that the received order slip is made in the first terminal apparatus 3.

Figure 9:
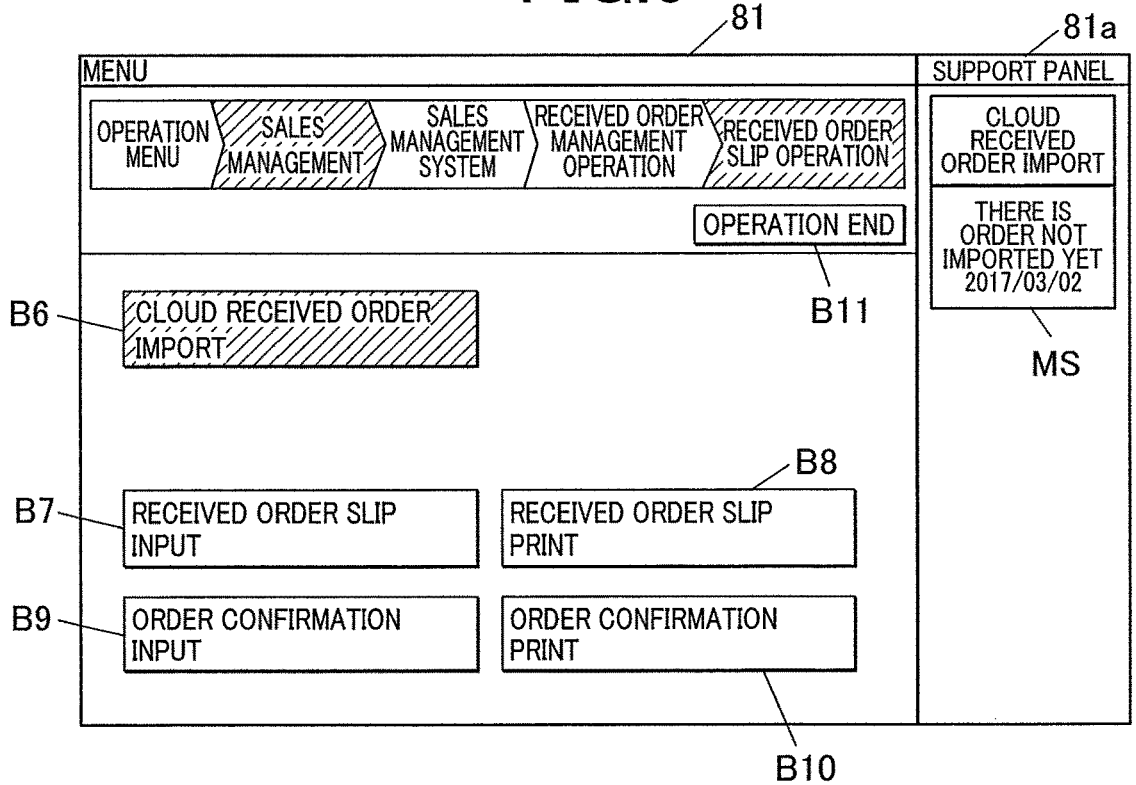
FIG. 9 is a diagram showing a received order slip operation menu screen.

FIG. 9 is a diagram showing a received order slip operation menu screen 81. This received order slip operation menu screen 81 is a screen displayed on the first terminal apparatus 3 when a file (not shown) regarding the received order slip operation is selected from an operation menu screen (not shown) displayed when the predetermined software is started to perform various data processes regarding the operation information DB 23b of the local server 2 connected to the first terminal apparatus 3 through the LAN 6. The received order slip operation menu screen 81 displays the menu button B6 to perform the function to import the received order from a cloud, that is, the function to import the received order memo to the local server 2. The received order slip operation menu screen 81 displays the menu buttons B7 to B10 to perform functions such as received order slip input, received order slip print, order confirmation input, order confirmation print, etc. The received order slip operation menu screen 81 displays an operation end button B11 to end the received order slip operation.

The received order slip operation menu screen 81 displays a support panel 81a on the right side of the screen, and the support panel 81a displays the message regarding various operations. In the example of FIG. 9, the support panel 81a displays a message MS showing there is a received order memo which is not yet imported from the cloud server 1. The received order slip operation menu screen 81 displays with emphasis the menu button B6 to perform the functions regarding the import of the received order from the cloud together with the display of the message MS. When the user selects the menu button B6, a later-described cloud received order import screen 82 can be displayed on the display 35.

Figure 10:
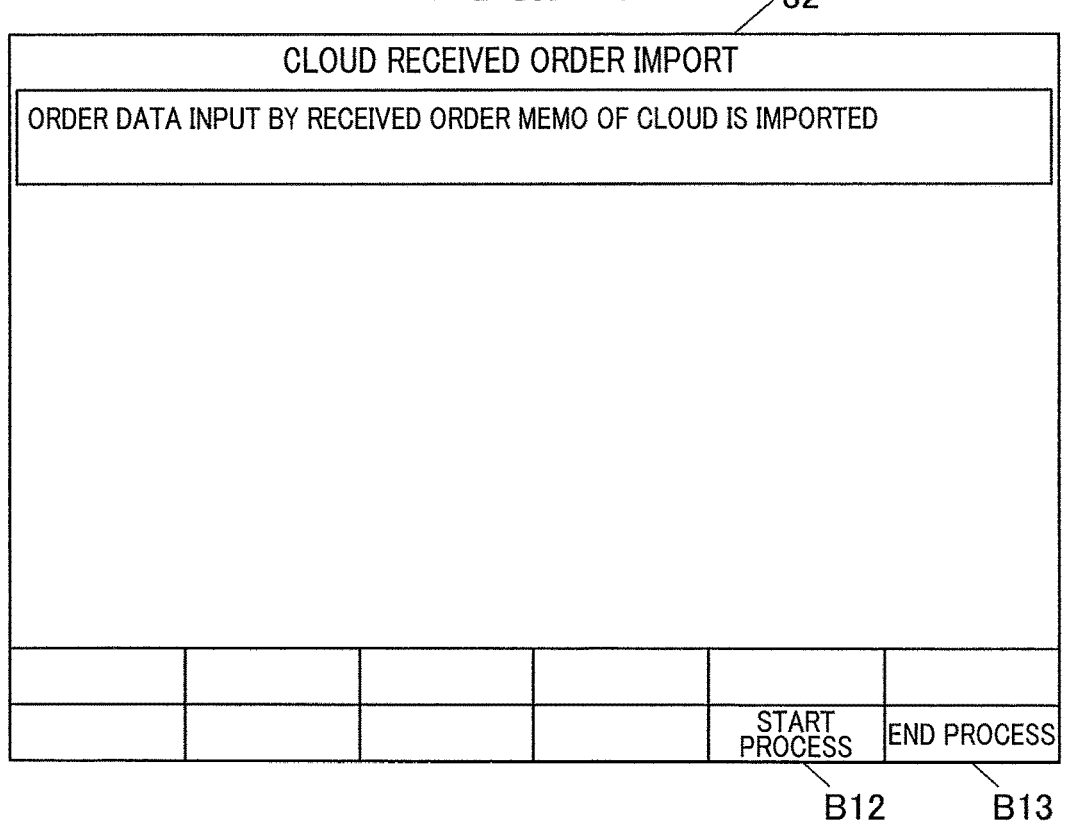
FIG. 10 is a cloud received order import screen.

FIG. 10 is a diagram showing the cloud received order import screen 82. The cloud received order import screen 82 displays a process start button B12 to start import of the received order memo and the process end button B13 to end the import of the received order memo.

The user performs input to select the process start button B12 so that the received order memo is imported by the local server 2 from the cloud server 1. When the local server 2 imports the received order memo, a later-descried received order slip input screen 83 is displayed on the display 35.

Figure 11:
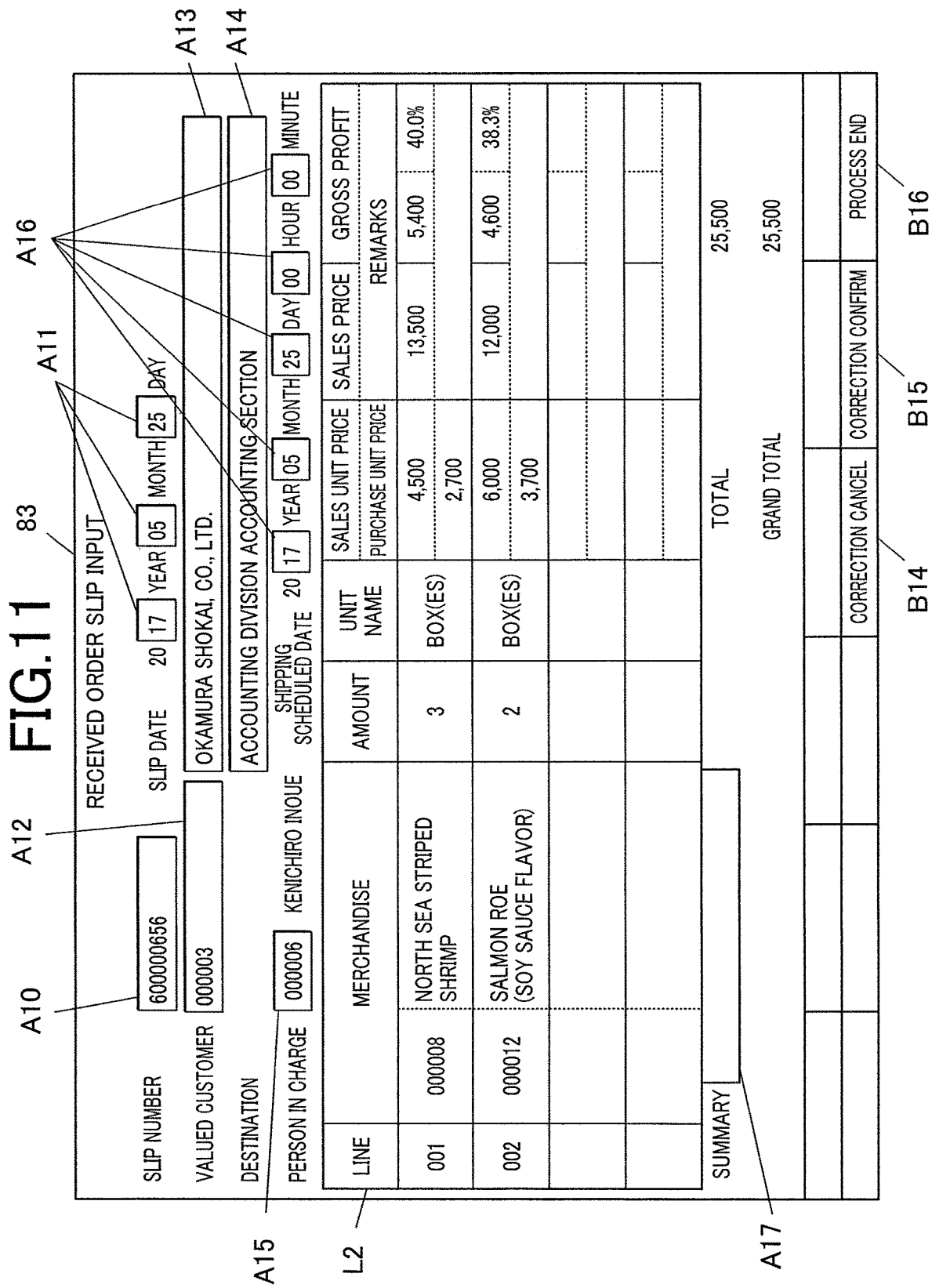
FIG. 11 is a diagram showing a received slip input screen displayed after importing the received order memo.

FIG. 11 is a diagram showing a received order slip input screen 83 (data input form) displayed after the received order memo is imported. The received order slip input screen 83 displays text boxes A10 to A17 to input a slip number, a slip date, the valued customer code, the valued customer name, destination, person in charge code, shipping scheduled date, shipping time, and summary, received order merchandise list L2 to input information regarding the merchandise of the received order, correction cancel button B14 to cancel correction of the contents displayed in the received order slip input screen 83, correction confirm button B15 to confirm correction regarding the contents displayed in the received order slip input screen 83, and the process end button B16 to close the received order slip input screen 83.

The example of FIG. 11 shows, after the received order memo showing the contents of FIG. 8 is imported, the user newly inputs "Accounting division, accounting section" as the destination in the text box A14 and "2,700" and "3,700" as the purchase unit price of the "North Sea striped shrimp" and "salmon roe (soy sauce flavor)" in the purchase unit price of the received order merchandise list L2. As shown in FIG. 11, among the items which can be input in the received order slip input screen 83, items such as slip date, valued customer code, valued customer name, person in charge code, shipping scheduled date, shipping time, and summary are the same as the input items in the received memo input screen 73 (see FIG. 8). Among the items which can be input on the received order slip input screen 83, items such as destination, purchase unit price, and gross profit are not input items in the received order memo input screen 73. That is, the items which can be input in the received order memo input screen 73 includes some of the items which can be input on the receive order input screen 83. The items which can be input on the received order slip input screen 83 include items different from the items which can be input in the received memo input screen 73. The gross profit displayed in the received order merchandise list L2 is automatically calculated from the amount, sales unit price, and purchase unit price input on the table.

The user adds and corrects the necessary items in the received order slip input screen 83 and selects the correction confirm button B15. With this, the received order slip can be registered (predetermined registration process).

<Flow of Order Receiving Operation Using Sales Management System>

Figure 12:
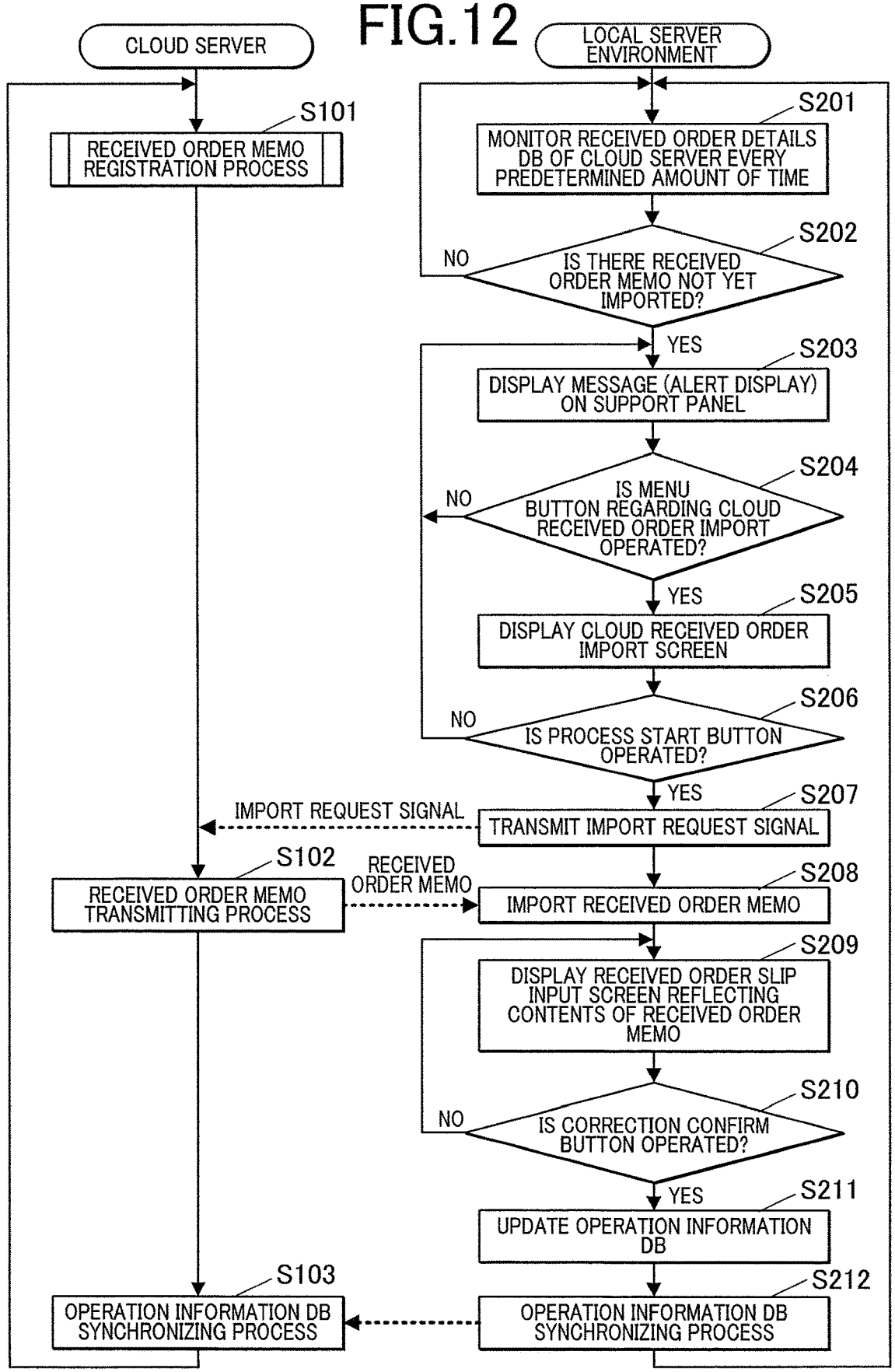
FIG. 12 is a flowchart showing an example of a flow of a received order operation using the sales management system.

The flow of the order receiving operation using the sales management system 100 according to the present embodiment is described with reference to FIG. 12. FIG. 12 is a flowchart showing an example of a flow of the order receiving operation using the sales management system 100. Here, the local server environment shown in FIG. 12 refers to the local server 2 and the first terminal apparatus 3 connected to the local server 2 through the LAN 6.

The processes of the local server environment are processes performed when predetermined software is started to perform various data processes regarding operation information DB23b of the local server 2. The description below describes the predetermined software started in the local server 2, but the processes of the local server environment are performed when the predetermined software is started in the first terminal apparatus 3 connected to the local server 2.

As shown in FIG. 12, the CPU 11 of the cloud server 1 first performs the received order memo registration process (step S101). Details of the received order memo registration process are described later.

Next, when the CPU 11 of the cloud server 1 receives the import request signal (later described) transmitted from the local server 2, the CPU 11 of the cloud server 1 transmits the received order memo corresponding to the local server 2 transmitting the import request signal (step S102).

Next, when the received order slip is registered in the local server 2 and the operation information DB 23b is updated, the CPU 11 of the cloud server 1 performs an operation information DB synchronizing process with the local server 2 to synchronize the operation information DB 13c corresponding to the operation information DB 23b of the local server 2 (step S103). Then, the process returns to step S101.

The CPU 21 of the local server 2 monitors the received order details DB of the cloud server 1 for a predetermined amount of time (for example, 5 minutes) (step S201), and determines whether there is a received order memo which is not imported (step S202).

In step S202, when it is determined that there is no non-imported received order memo (step S202; NO), the CPU 21 of the local server 2 returns the process to step S201.

In step S202, when it is determined that there is a non-imported received order memo (step S202; YES), the CPU 21 of the local server 2 displays a message MS (alert display) showing there is a received order memo which is not yet imported from the cloud server 1 on the support panel 81a of the received order slip operation menu screen 81 (step S203) as shown in FIG. 9.

Next, the CPU 21 of the local server 2 determines whether there is input on the received order slip operation menu screen 81 using the operating unit 24 to select the menu button B6 to perform the function of cloud received order import (step S204).

In step S204, when it is determined that the input to select the menu button B6 to perform the function regarding the cloud received order import is not performed (step S204; NO), the CPU 21 of the local server 2 returns the process to step S203.

In step S204, when it is determined that the input to select the menu button B6 to perform the function regarding the cloud received order import is performed (step S204; YES), the CPU 21 of the local server 2 displays the cloud received order import screen 82 shown in FIG. 10 on the display 25 (step S205).

Next, the CPU 21 of the local server 2 determines whether the input to select the process start button B12 is performed on the cloud received order import screen 82 using the operating unit 24 (step S206).

In step S206, when it is determined that the input to select the process start button B12 is not performed, that is, the input to select the processing end button B13 is performed (step S206; NO), the CPU 21 of the local server 2 returns the process to step S203. In step S206, when it is determined that the input to select the process start button B12 is performed (step S206; YES), the CPU 21 of the local server 2 transmits the import request signal to the cloud server 1 (step S207).

Next, the CPU 21 of the local server 2 imports the received order memo from the cloud server 1 (step S208), and displays on the display 25 the received order slip input screen 83 with the contents of the received order memo reflected as shown in FIG. 11 (step S209).

Next, the CPU 21 of the local server 2 determines whether the input to select the correction confirm button B15 is performed on the received order slip input screen 83 using the operating unit 24 (step S210).

In step S210, when it is determined that the input to select the correction confirm button B15 is not performed (step S210; NO), the CPU 21 of the local server 2 returns the process to step S209.

In step S210, when it is determined that the input to select the correction confirm button B15 is performed (step S210; YES), the CPU 21 of the local server 2 updates the operation information DB 23b (step S211), synchronizes the operation information DB 23b of the local server 2 with the operation information DB 13c of the cloud server 1 corresponding to the operation information DB 23b of the local server 2 (step S212), and returns the process to step S201.

Figure 13:
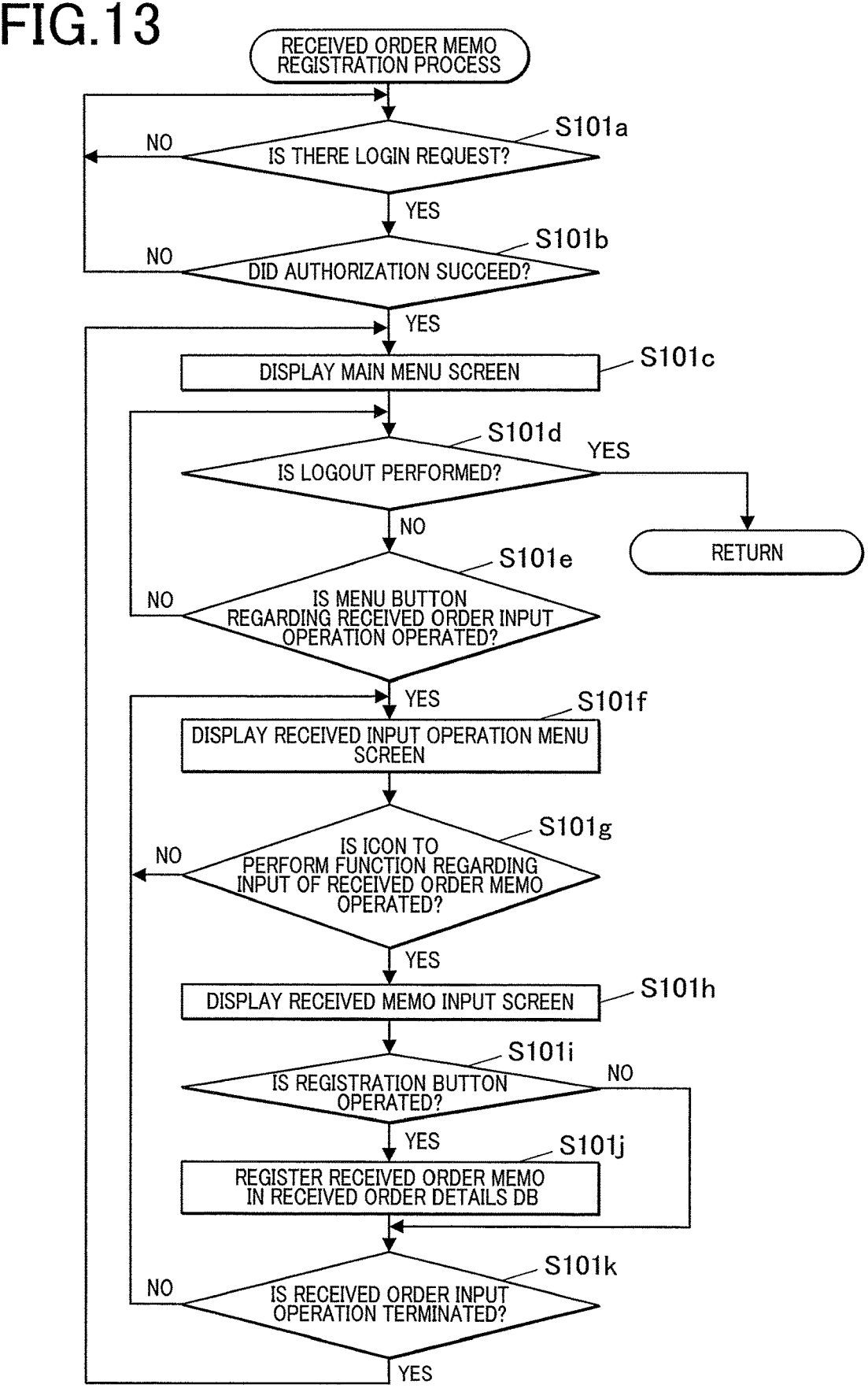
FIG. 13 is a flowchart showing a received order memo registration process.

FIG. 13 is a flowchart showing the received order memo registration process.

When the received order memo registration process is called, the CPU 11 of the cloud server 1 determines whether the login request together with the input of the authorization information (for example, user name and password) is made on the login screen 71 (see FIG. 6) displayed on the display 45 of the second terminal apparatus 4 (step S101a).

In step S101a, when it is determined that there is no login request (step S101a; NO), the CPU 11 of the cloud server 1 returns the process to step S101a.

In step S101a, when it is determined that there is a login request (step S101a; YES), the CPU 11 of the cloud server 1 determines whether the authorization of the input authorization information succeeded (step S101b). According to the present embodiment, the CPU 11 of the cloud server 1 determines that the authorization succeeded when the input authorization information matches with the authorization information of any of the accounts stored in the account DB 13b.

In step S101b, when it is determined that the authorization of the input authorization did not succeed, that is, failed (step S101b; NO), the CPU 11 of the cloud server 1 returns the process to step S101a.

In step S101b, when it is determined that the authorization of the input authorization information succeeded (step S101b; YES), the CPU 11 of the cloud server 1 displays the main menu screen (not illustrated) on the display 45 (step S101c).

Next, the CPU 11 of the cloud server 1 determines whether the logout process is performed on the main menu screen using the operating unit 44 (step S101d).

In step S101d, when it is determined that the logout process is performed (step S101d; YES), the CPU 11 of the cloud server 1 ends the received order memo registration process.

In step S101d, when it is determined that the logout process is not performed (step S101d; NO), the CPU 11 of the cloud server 1 determines whether the input to select the menu button (not illustrated) regarding the received order input operation is performed on the main menu screen using the operating unit 44 (step S101e).

In step S101e, when it is determined that the input to select the menu button regarding the received order input operation is not performed (step S101e; NO), the CPU 11 of the cloud server 1 returns the process to step S101d.

In step S101e, when it is determined that the input to select the menu button regarding the received order input operation is performed (step S101e; YES), the CPU 11 of the cloud server 1 displays the received order input operation menu screen 72 on the display 45 as shown in FIG. 7 (step S101f).

Next, the CPU 11 of the cloud server 1 determines whether the input to select the icon I1 to perform the function regarding the input of the received order memo is performed on the received order input operation menu screen 72 using the operating unit 44 (step S101g).

In step S101g, when it is determined that the input to select the icon I1 to perform the function regarding the input of the received order memo is not performed (step S101g; NO), the CPU 11 of the cloud server 1 returns the process to step S101f.

In step S101g, when it is determined that the input to select the icon I1 to perform the function regarding the input of the received order memo is performed (step S101g; YES), as shown in FIG. 8, the CPU 11 of the cloud server 1 displays the received order memo input screen 73 on the display 43 (step S101*h*).

Next, the CPU 11 of the cloud server 1 determines whether the input to select the registration button B4 is performed on the received order memo input screen 73 using the operating unit 44 (step S101*i*).

In step S101*i*, when it is determined that the input to select the registration button B4 is performed (step S101*i*; YES), the CPU 11 of the cloud server 1 registers the received order memo in the received order details DB (step S101*j*) and advances the process to step S101*k*.

In step S101*i*, when it is determined that the input to select the registration button B4 is not performed (step S101*i*; NO), the CPU 11 of the cloud server 1 skips step S101*j* and advances the process to step S101*k*.

Next, in step S101*k*, the CPU 11 of the cloud server 1 determines whether the operation to end the received order input operation is performed (step S101*k*).

In step S101*k*, when it is determined that the operation to end the received order input operation is not performed (step S101*k*; NO), the CPU 11 of the cloud server 1 returns the process to step S101*f*.

In step S101*k*, when it is determined that the operation to end the received order input operation is performed (step S101*k*; YES), the CPU 11 of the cloud server 1 returns the process to step S101*c*.

According to the sales management system 100 of the present embodiment, the cloud server 1 receives the input of the received order memo (temporary input data) used in the process of registration of the received order slip (predetermined registration process) performed in the local server 2 from the second terminal apparatus 4 (terminal apparatus). The cloud server 1 transmits the received order memo to the local server 2 based on the transmit request from the local server 2 of the user (client) who performed input of the received order memo.

Therefore, even if an order is received outside the office, the user is able to input the received order memo regarding the order on the second terminal apparatus 4 and register the received order menu in the cloud server 1. The local server 2 is able to receive the received order memo. With this, the input of transaction data regarding the received order can be performed simply and rapidly based on the received order memo.

The local server 2 monitors whether the received order memo (temporary input data) used in the registration process (predetermined registration process) of the received order slip performed in the local server 2 is received in the cloud server 1. When it is determined that the received order memo is received, the local server 2 requests the transmitting of the received order memo to the cloud server 1 and receives the received order memo. The local server 2 reflects the received order memo which is received on the data input form of the received order slip (received order slip input screen 83). When the data input on the data input form is complete, the data input on the data input form is registered in the operation information DB 23*b* of the local server 2.

As described above, the local server 2 monitors whether the received order memo is received by the cloud server 1 and the local server 2 can immediately import the received order memo when the received order memo is actually received in the cloud server 1. Therefore, the process to input the transaction data regarding the received order can be performed rapidly. The imported received order memo is reflected on the data input form of the received order slip (received order slip input screen 83) and therefore, the input process of the transaction data regarding the received order can be performed easily and rapidly.

When the local server 2 determines that the received order memo is received in the cloud server 1, the local server 2 notifies to the user that the received order memo is received, and requests to the cloud server 1 to transmit the received order memo in reply to predetermined handling by the user who is notified that the received order memo is received. Therefore, for example, after the user in charge of sales receives the order outside the office, inputs the received order memo regarding the order using the second terminal apparatus 4, and registers the received order memo in the cloud server 1, a different user such as the clerical staff can import the received order memo in the local server 2 immediately. Therefore, the received order operation can be performed timely in the local server 2.

The local server 2 monitors whether the received order memo is received in the cloud server 1 after every predetermined amount of time. Therefore, the received order memo can be imported in the local server 2 rapidly when the received order memo is actually received in the cloud server 1. Therefore, the input process of the transaction data regarding the received order can be performed rapidly.

When the data input in the data input form (received order slip input screen 83) is registered in the operation information DB 23*b* of the local server 2, the local server 2 synchronizes the operation information DB 23*b* with the operation information DB 13*c* of the cloud server 1. Therefore, the operation information DB 13*c* of the cloud server 1 can be maintained in the newest state similar to the operation information DB 23*b* of the local server 2. By using the cloud server 1 outside the office also, sales promotion using the operation information can be performed. The operation information DB 13*c* of the cloud server 1 can be used as backup.

According to the above description, the example using the HDD, SSD, etc. of the storage 13 as the computer readable medium for the program 13*a* of the cloud server 1 according to the present invention is described. Moreover, the example using the HDD, SSD, etc. of the storage 23 as the computer readable medium for the program 23*a* of the local server 2 is described. However, the present invention is not limited to the above. A portable recording medium such as a CD-ROM can be used as other computer readable mediums. The data of the program 13*a* of the cloud server 1 and the program 23*a* of the local server 2 can be provided through the communication lines using a medium such as a carrier wave.

The description according to the present embodiment is one example of the cloud server, the local server, the program, the information processing system and the information processing method of the information processing system according to the present invention, and the present invention is not limited to the above.

The detailed configuration and the detailed operation of the devices composing the sales management system 100 can be suitably modified without leaving the scope of the present invention.

For example, according to the present embodiment, a flow of the process shows completing a process of registration of a received order slip (predetermined registration process) by receiving a received order memo (temporary input data) on the cloud server 1, importing the received order memo on the local server 2, and data input on the received order slip input screen 83 (data input form) reflecting the contents of the received order memo. However, the target of the registration process can be a slip regarding transaction data and is not limited to a received order slip.

According to the above-described embodiment, the local server environment includes a local server 2, and a first terminal apparatus 3 connected to the local server 2 through a LAN 6. However, this can be only a local server 2.

Although embodiments of the present invention are described above, the scope of the present invention is not limited to the embodiments described above. The scope of the present invention includes the present invention as claimed and its equivalents.

What is claimed is:

1. An information processing system comprising:
   a local server; and
   a cloud server which is connected to the local server through a network and which is provided in a cloud environment,
   wherein:
   the cloud server includes a first hardware processor configured to:
   receive, from a terminal apparatus, input of temporary input data to be used in a predetermined registration process to be performed in the local server, wherein the terminal apparatus from which the first hardware processor of the cloud server receives input of the temporary input data is connected to the cloud server through the internet, outside of a local server environment from which the predetermined registration process is performed, and
   transmit the temporary input data to the local server in response to a transmitting request received from the local server, and
   the local server includes a second hardware processor configured to:
   monitor whether the temporary input data to be used in the predetermined registration process performed in the local server is received in the cloud server, and
   perform the predetermined registration process,
   wherein, in performing the predetermined registration process, the second hardware processor is configured to:
   transmit the transmitting request to the cloud server to request that the cloud server transmit, to the local server, the temporary input data when it is determined by the monitoring that the temporary input data is received by the cloud server,
   receive the temporary input data transmitted by the cloud server in response to the transmitted transmitting request;
   input the temporary input data received from the cloud server into corresponding data entry fields of a data input form of the predetermined registration process, wherein the data input form is stored in advance by the local server, and
   register the temporary input data received from the cloud server and that has been inputted into the data input form in a database of the local server, to thereby complete the predetermined registration process,
   wherein:
   the cloud server is configured to store, in advance, a temporary data input form including a plurality of data entry fields for inputting corresponding items of the temporary input data,
   the local server is configured to store, in advance, the data input form of the predetermined registration process,
   the plurality of data entry fields of the temporary data input form stored in advance by the cloud server correspond to some of the data entry fields of the data input form of the predetermined registration process stored in advance by the local server,
   the plurality of data entry fields of the data input form of the predetermined registration process stored in advance by the local server include data entry fields corresponding to all of the data entry fields of the temporary data input form, and further include a data entry field for inputting a data input item that is not included among the plurality of data entry fields of the temporary data input form stored in advance by the cloud server, and
   the second hardware processor of the local server is configured to display, on a display, the data input form and to receive, via a user operation input from a local server environment of the local server, input of the data input item into the data entry field that is included in the data input form and that is not included among the plurality of data entry fields of the temporary data input form stored in advance by the cloud server.

2. The information processing system according to claim 1, wherein the second hardware processor of the local server is further configured to:
   issue a notification indicating that the temporary input data is received by the cloud server when it is determined by the monitoring that that the temporary input data is received by the cloud server, and
   after issuing the notification, transmit the transmitting request to the cloud server in response to a user operation.

3. The information processing system according to claim 1, wherein the second hardware processor monitors whether the temporary input data is received by the cloud server each time a predetermined amount of time passes.

4. The information processing system according to claim 1, wherein the second hardware processor of the local server is further configured to perform a synchronizing process with the cloud server such that the database of the local server and a database of the cloud server include the same data, when the predetermined registration process performed by the second hardware processor is completed.

5. The information processing system according to claim 1, wherein the second hardware processor is configured to perform, as the predetermined registration process, at least a received order registration process which is a process for registering, in the database of the local server, information about a received order input at and received by the cloud server.

6. The information processing system according to claim 1, wherein:
   the data input form includes, among the plurality of data entry fields, a data entry field for inputting at least one of the following items: a slip number, a slip date, a delivery date, a valued customer number, a valued customer name, a merchandise number, a merchandise name, an order amount, an order unit, a unit price, a merchandise price, and a total price.

7. The information processing system according to claim 1, wherein:
   wherein the first hardware processor of the cloud server is configured to cause the terminal apparatus to display the temporary data input form on a display of the terminal apparatus, and to receive input of the temporary input data according to an operation by a user to input the temporary input data into the temporary input data form displayed on the display of the terminal apparatus.

8. An information processing method of an information processing system including a local server, and a cloud server which is connected to the local server through a network and which is provided in a cloud environment, the information processing method comprising:

receiving, by a first hardware processor of the cloud server, from a terminal apparatus, input of temporary input data to be used in a predetermined registration process to be performed in the local server, wherein the terminal apparatus from which the first hardware processor of the cloud server receives input of the temporary input data is connected to the cloud server through the internet, outside of a local server environment from which the predetermined registration process is performed;

monitoring, by a second hardware processor of the local server, whether the temporary input data to be used in the predetermined registration process performed in the local server is received in the cloud server;

performing, by the second hardware processor of the local server, the predetermined registration process;

in performing the predetermined registration process by the second hardware processor of the local server, transmitting, by the second hardware processor of the local server, to the cloud server, a transmitting request to request that the cloud server transmit, to the local server, the temporary input data when it is determined in the monitoring by the second hardware processor that the temporary input data is received by the cloud server;

transmitting, by the first hardware processor of the cloud server, the temporary input data to the local server in response to the transmitting request received from the local server;

in performing the predetermined registration process by the second hardware processor of the local server, receiving, by the second hardware processor of the local server, the temporary input data transmitted by the cloud server in response to the transmitted transmitting request;

in performing the predetermined registration process by the second hardware processor of the local server, inputting, by the second hardware processor of the local server, the temporary input data received from the cloud server into corresponding data entry fields of a data input form of the predetermined registration process, wherein the data input form is stored in advance by the local server; and in performing the predetermined registration process by the second hardware processor of the local server, registering, by the second hardware processor of the local server, the temporary input data received from the cloud server and that has been inputted into the data input form in a database of the local server, to thereby complete the predetermined registration process, wherein the information processing method further comprises:

storing in advance, by the first hardware processor of the cloud server, a temporary data input form including a plurality of data entry fields for inputting corresponding items of the temporary input data, and storing in advance, by the second hardware processor of the local server, the data input form of the predetermined registration process, wherein the plurality of data entry fields of the temporary data input form stored in advance by the cloud server correspond to some of the data entry fields of the data input form of the predetermined registration process stored in advance by the local server, wherein the plurality of data entry fields of the data input form of the predetermined registration process stored in advance by the local server include data entry fields corresponding to all of the data entry fields of the temporary data input form, and further include a data entry field for inputting a data input item that is not included among the plurality of data entry fields of the temporary data input form stored in advance by the cloud server, and wherein the information processing method further comprises displaying, by the second hardware processor of the local server, the data input form on a display and receiving, by the second hardware processor of the local server, via a user operation input from the local server environment of the local server, input of the data input item into the data entry field that is included in the data input form and that is not included among the plurality of data entry fields of the temporary data input form stored in advance by the cloud server.

9. The information processing method according to claim 8, further comprising issuing, by the second hardware processor of the local server, a notification indicating that temporary input data is received a notification indicating that by the cloud server when it is determined in the monitoring that the temporary input data is received by the cloud server, and after issuing the notification, transmitting the transmitting request to the cloud server in response to a user operation.

10. The information processing method according to claim 8, wherein the monitoring by the second hardware processor of the local server includes monitoring whether the temporary input data is received by the cloud server each time a predetermined amount of time passes.

11. The information processing method according to claim 8, further comprising performing, by the second hardware processor of the local server, a synchronizing process with the cloud server such that the database of the local server and a database of the cloud server include the same data, when the predetermined registration process performed by the second hardware processor is completed.

12. The information processing method according to claim 8, wherein performing the predetermined registration process includes performing, by the second hardware processor of the local server, as the predetermined registration process, at least a received order registration process which is a process for registering, in the database of the local server, information about a received order input at and received by the cloud server.

13. The information processing method according to claim 8, wherein the data input form includes, among the plurality of data entry fields, a data entry field for inputting at least one of the following items: a slip number, a slip date, a delivery date, a valued customer number, a valued customer name, a merchandise number, a merchandise name, an order amount, an order unit, a unit price, a merchandise price, and a total price.

14. The information processing method according to claim 8, wherein:
 the receiving, by the first hardware processor of the cloud server of the input of the temporary input data, comprises receiving the input of the temporary input data with the temporary data input form.

\* \* \* \* \*

UNITED STATES PATENT AND TRADEMARK OFFICE
CERTIFICATE OF CORRECTION

PATENT NO. : 11,017,457 B2
APPLICATION NO. : 16/045508
DATED : May 25, 2021
INVENTOR(S) : Hiroyuki Yoshida It is certified that error appears in the above-identified patent and that said Letters Patent is hereby corrected as shown below:

In the Claims

Column 14, Line 26 (Claim 2, Line 6), after "monitoring that" delete "that".

Column 14, Line 59 (Claim 7, Line 2), delete "wherein:".

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*